2,999,764
PROCESS FOR SURFACING PRESOFTENED POLY-AMIDE WITH AN IN SITU CURABLE ELASTOMER

Joseph Edgar Rhoads, Beaver Valley Road, R.D. 2, New Castle County, Del.
No Drawing. Filed June 19, 1957, Ser. No. 666,768
7 Claims. (Cl. 117—47)

This invention relates to a surfaced polyamide and the process of producing the same. More particularly, the product of the present invention is admirably suited for uses such as belting in power transmission devices.

As is known, products for the above use require a material which combines high tensile strength with a high coefficient of friction, excellent abrasion resistance, and satisfactory oil and solvent resistance. The product of this invention combines the above properties with permanence on aging, i.e., retention of physical properties, including low permanent stretch, and exhibits good thermal resistance.

The use of leather belting reinforced with a variety of reinforcing agents such as cellulose or metal cords has been described in the prior art, but such modified leathers suffer from many of the weaknesses inherent in the leather itself. Attempts have also been made to employ linear polyamides as belting in order to utilize the high tensile strength of such polymers. These belting materials have, however, been of limited utility because of their low coefficient of friction, and consequential low efficiency of power transmission. Furthermore, because of the low strength of the polyamide in the transverse direction of the belt, such belts tend to split in the longitudinal direction after relatively short service periods.

In accordance with the present invention, we have discovered that it is possible to treat the surface of a polyamide so as to increase its coefficient of friction and simultaneously reinforce the polyamide in the transverse direction so that longitudinal splitting in service is prevented, i.e., under normal conditions of use. This is accomplished by surfacing a synthetic polyamide base with a layer of polyurethane elastomer in the critical manner hereinafter described. The layer of polyurethane elastomer so deposited is characterized by a high coefficient of friction, excellent adhesion to the polyamide base, and high oil, abrasion and aging resistance. In the case of belting, the polyurethane elastomer is deposited on at least those surfaces which are referred to as contact or pulley contacting surfaces in order to impart the requisite high coefficient of friction.

Although polyamides in general are suitable for the present invention, e.g., such as those prepared by the interaction of adipic acid and hexamethylene diamine or beta-methyladipic acid and hexamethylene diamine or the polymerization of a caprolactam, the preferred polyamides are those which have high tensile strength because of molecular orientation about their longitudinal axes. Typical of such polyamides are those sold by E. I. du Pont de Nemours & Co. under the name "Zytel 211," which may be extruded or cast into solid form and drawn for molecular orientation purposes. Such polymers are well known in the art.

As is also known, polyurethane elastomers are prepared by suitably catalyzing a mixture of a polyol of the formula HO—R—OH and a polyisocyanate of the formula $R_1(NCO)_x$ where $x$ is an integer greater than 1.

HO—R—OH may be a high molecular weight polyester of the type hereinafter described or a polyether such as polyethylene glycol or polypropylene glycol with molecular weights preferably in the range of 1200–2000.

A variety of acids and glycols may be used in the preparation of the polyester. Although such dibasic acids as adipic, azelaic, succinic, sebacic and phthalic are commonly employed, any dibasic carboxylic acid containing a total of at least 3 carbon atoms, and preferably those in which the carboxyl groups are attached to the terminal carbon atoms, may be used.

Any glycol or mixtures thereof may be used in the formation of the polyester including ethylene glycol, propylene glycol, dipropylene, 1,4-butandiol, 2-ethyl hexanediol-1,3, as well as glycerol mono-ethers.

The preparation of polyesters suitable for the preparation of polyurethane elastomers is well known to those skilled in the art as exemplified by U.S. Patents 2,625,531 and 2,753,319 and "Modern Plastics," vol. 24, pages 149 et seq. (1947).

The formula $R_1(NCO)_x$ represents a polyisocyanate. As is known in the art, a wide variety of polyisocyanates may be used satisfactorily. Although 2,4-tolylene diisocyanate is preferred, others such as hexamethylene diisocyanate, tetramethylene diisocyanate, 1,5-naphthalene diisocyanate and triisocyanates such as 4,4',4"-triisocyanate triphenylmethane and 2,4,6-triisocyanate toluene may be employed.

Useful catalysts for preparing the polyurethane elastomers include diamines, certain polyols, and titanate esters. As preferred diamines are included methylene-bis-orthochloraniline, metaphenylene diamine, meta-toluene diamine, and ethylene-diamine. The polyol curing agents or catalysts are exemplified by castor oil and ethylene diamine tetraisopropanol. Preferred titanate esters include tetrapropyl and tetrabutyl titanates. In general, the diamines give the best physical properties, as is known, but blends of these catalysts may be employed to control pot life and curing cycles of the uncured compound and the physical properties of the cured polyurethane elastomer surface.

In accordance with the method of the present invention, a liquid composition for forming the polyurethane elastomer is applied to a pretreated polyamide surface and cured in situ. The liquid composition for forming the polyurethane elastomer may comprise a prepolymer, i.e., the reaction product of the polyol (HO—R—OH) and the polyisocyanate, together with a curing agent or may be a mixture of essentially unreacted polyol, polyisocyanate, and curing agent or catalyst. Either of the above mixtures may be applied by means such as dipping, brushing, or knife coating, but a preferred method includes the use of a special spray gun. In the case of the liquid composition including a prepolymer and a curing agent, the preferred composition of the present invention, the spray gun feeds prepolymer to the spray nozzle in one stream and the curing agent or catalyst to the nozzle in another stream. In the case of the 3-component liquid mixture, three separate streams feed the individual components to the spray nozzle. Intimate mixing occurs at the nozzle, and the homogeneously catalyzed composition is deposited on the surface of the polyamide. As is well known in the art, the use of a special gun of this type permits the use of very active catalysts and deposits films of controllable thickness.

A critical step in accordance with the present invention involves pretreatment of the polyamide surface before deposition of the liquid urethane composition. I have found that it is essential to prepare the polyamide surface by softening it with a solvent for the polyamide. Unless the surface is prepared in this fashion, the adhesion between the two components will be so low that delamination will result under normal service conditions. Agents such as aromatic hydroxy compounds and the lower fatty acids are examples of the known polyamide softening agents. Typical of the aromatic hydroxy compounds are phenol, cresol, and resorcinol. Formic and acetic acids are representative of the fatty acid group, The aromatic hydroxy compounds are preferred. Some of these aromatic hydroxy compounds are solid at room temperature and are therefore most easily applied to the polyamide surface by the use of a solvent solution, suitable solvents including aromatic hydrocarbons, lower alkanols, ketones, etc.

Although the above described preparation step for the polyamide surface is essential in order to obtain satisfactory bonding between the urethane elastomer and polyamide, the exact mechanism involved is not fully understood. Attempts have been made to bond a fully cured polyurethane elastomer sheet to the polyamide surface both with and without the use of the softening agent. Neither of the resulting products obtain a sufficient bonding strength to permit use of the product as transmission belting for any useful period of service life. When a partially cured polyurethane elastomer sheet is applied to a fully hard or a presoftened polyamide surface, the resulting bonds are equally unsatisfactory. This would indicate that increased chemical interaction between the urethane composition and the polyamide is not the sole function of pretreatment of the polyamide. On the other hand, attempts to roughen the polyamide surface have not resulted in a sufficient increase of surface area to permit satisfactory bonding. Thus, it may be deduced that the function of softening the polyamide surface prior to the application of the liquid urethane composition is not one entirely for the purpose of increasing mechanical bonding strength. As a result of the foregoing, it can only be concluded that satisfactory bonding of a polyurethane elastomer to a polyamide is obtained when the defined critical step of pretreating the polyamide surface is carried out and followed by curing the composition in situ.

The step of softening the polyamide surface with a solvent for the polyamide is most conveniently accomplished by wetting the polyamide surface with the selected softening agent and allowing the softening agent to act on the polyamide surface. It is desirable to remove any excess softening agent or solvent therefor prior to applying the liquid elastomer composition. This step eliminates possible undesired bubbling which would occur during the subsequent curing operation.

The method of curing the applied liquid polyurethane composition is well understood by those skilled in the art and involves a simple heating operation for a time sufficient to obtain the desired degree of cross-linking. There are, however, certain steps in the operation which should be carefully carried out in order to obtain best results. Thus, in the event a solvent such as toluene is employed for the purpose of dissolving the catalyst in the liquid composition or for controlling the viscosity of the liquid composition, preferred results are obtained if the solvent is removed prior to subjecting the surface coated polyamide to a heat treatment step. Solvent removal in this manner avoids undesired bubbles in the polyurethane. The temperature for curing the liquid composition is determined primarily by the maximum temperature that the selected polyamide will withstand without affecting its molecular orientation or causing undesired oxidation. In general, temperatures of less than 200° C. are preferred, the lower the temperatures selected, the longer the curing period required. An initial curing period of from 15 minutes to 2 hours will suffice to form a solid elastomer composition, but a post curing heat treatment of several hours duration may be desirable to further cross-link the polyurethane. The extent of this latter treatment will be determined by the use of the resulting product.

The curing operation may be carried out in a temperature controlled oven but is more desirably carried out in the usual platen press including side shims for maintaining the liquid composition in place during curing. Such methods are conventional in the art and are, accordingly, well understood.

As heretofore indicated, a preferred embodiment of the product of the present invention is in the form of belting for power transmission purposes. This belting may be produced in a number of different ways. Thus, the polyamide may be cast in the form of an endless belt and the polyurethane liquid composition applied on those surfaces where a high coefficient of friction is desired or may, if desired, be applied on all surfaces of the polyamide. On the other hand, the polyamide may be extruded or cast to a desired cross section, the elastomer applied after pretreatment of the polyamide, cured in situ, and the ends of the desired length of the resulting product joined by conventional means such as lacing, riveting, cementing, etc. It will be understood that preferred embodiments include molecular orientation of the polyamide prior to coating with the polyurethane.

Although the foregoing description of the article of manufacture of the present invention has been directed to an article primarily intended for use as belting, it will be appreciated that the product of the present invention is useful for many other and varied purposes. Thus, the article of manufacture is useful as strapping in power transmission devices, as industrial packing for glands, pumps, cylinders, etc. It will be understood by those skilled in the art that there is a preferred choice of polyamide and polyurethane elastomer for each selected use, i.e., the necessary tensile strength, coefficient of friction, abrasion resistance, and other properties for such uses are well known as are the corresponding properties for specific polyamide and polyurethane elastomers.

The foregoing description and the examples appearing hereinafter are for the purpose of illustration only and not limiting to the scope of the present invention which is set forth in the claims.

*Example I*

To one mol of an adipic-ethylene glycol polyester with an acid number of 2.0 and a hydroxyl number of 55, was added 2.1 mols of 2,4-tolylene diisocyanate. This mixture was heated to 110–120° C. and allowed to cool to room temperature. This composition will subsequently be referred to as "the prepolymer."

20 parts by weight of toluene were added to 100 parts by weight of the prepolymer. This solvent cut prepolymer was fed to one inlet of the special spray gun previously described, and a 50% by weight solution of methylene-bis-orthochloroaniline in toluene was fed to the other inlet of the spray gun. The feeds to the spray gun were adjusted so that 100 parts of polymer were injected to the nozzle for every 11 parts of methylene-bis-orthochloroaniline. This mixture was sprayed onto a polyamide sheet ("Zytel 211") which had been previously wiped with a 50% solution of phenol in toluene and allowed to stand at room temperature for about 15 minutes prior to spraying. This period was to allow the phenol to soften the surface and permit evaporation of toluene solvent.

The uncured urethane surfacing composition was applied at such a rate that the resultant cured film was about 10 mils thick. After spraying, the film was dried to remove the toluene at room temperature. When the toluene had been removed, the surfaced polyamide was cured for 60 minutes at 185° F. While it is possible to effect this cure in an oven at atmospheric pressure, a conventional platen press with side shims was used to prevent excessive squeeze-out and to maintain the desired thickness in the surfacing layer. Such precautions are well known in the art. The resulting product was post cured in an oven for five hours at a temperature of about 160° F.

*Example II*

30 parts by weight of methyl ethyl ketone were added to 100 parts by weight of the prepolymer as described in Example I. The catalyst solution was prepared by dissolving 5 parts by weight of methylene-bis-orthochloraniline in 18 parts by weight of castor oil, and the prepolymer solution and catalyst solution were fed to the two-feed spray gun at such a rate that 100 parts of prepolymer solids were mixed in the nozzle with 23 parts by weight of the catalyst solution.

Prior to spraying, the polyamide surface was coated with a 90% aqueous solution of formic acid, and thoroughly dried by heating in an oven at 100° F. for 30 minutes.

After spraying the treated polyamide, the drying, curing, and post curing operations were carried out as described in Example I.

*Example III*

The procedure of Example I was repeated while substituting a 35% solution of resorcinol in one case and a 50% solution of cresol in another for the phenol softening agent of Example I. Equally satisfactory products were obtained.

*Example IV*

The procedure of Example I was repeated while substituting an equal amount of "Adiprene L," a product of E. I. du Pont de Nemours & Co., for the prepolymer of that example. The resulting product was equally satisfactory. It is understood that "Adiprene L" is an isocyanate terminated prepolymer of 2,4-tolylene diisocyanate and ethylene ether glycol. An isocyanate prepolymer from these constituents is effective for the purpose of the present invention.

What is claimed is:

1. An article of manufacture comprising a synthetic polyamide base having on at least one surface an integral surface coating comprising a polyurethane elastomer, the elastomer having been applied to the surface as a liquid composition and cured in situ after softening the polyamide surface with a solvent for the polyamide.

2. The article of manufacture of claim 1 wherein the solvent for the polyamide is selected from the group consisting of formic acid, acetic acid, cresol, resorcinol, and phenol.

3. The article of manufacture of claim 1 wherein the polyurethane elastomer is the reaction product of a high molecular weight polyester and a polyisocyanate catalyzed with a diamine curing agent.

4. The article of manufacture of claim 1 wherein the polyurethane elastomer is the reaction product of a high molecular weight polyether and a polyisocyanate catalyzed with a diamine curing agent.

5. The article of manufacture of claim 1 wherein the synthetic polyamide base is a linear synthetic polyamide which has been molecularly oriented along its longitudinal axis.

6. The process comprising the steps of softening the surface of a synthetic polyamide base with a solvent softening agent for the polyamide, applying liquid urethane elastomer composition to the softened surface of the polyamide, and subsequently curing the urethane elastomer composition in situ.

7. The process of claim 6 wherein the solvent for the polyamide is selected from the group consisting of formic acid, acetic acid, cresol, resorcinol, and phenol.

References Cited in the file of this patent

UNITED STATES PATENTS

| 2,130,948 | Carothers | Sept. 20, 1938 |
| 2,349,290 | Loughborough | May 23, 1944 |
| 2,406,454 | Charlton et al. | Aug. 27, 1946 |
| 2,712,987 | Storrs et al. | July 12, 1955 |
| 2,721,811 | Dacey et al. | Oct. 25, 1955 |

FOREIGN PATENTS

| 151,392 | Australia | Apr. 26, 1951 |

UNITED STATES PATENT OFFICE
CERTIFICATE OF CORRECTION

Patent No. 2,999,764 September 12, 1961

Joseph Edgar Rhoads

It is hereby certified that error appears in the above numbered patent requiring correction and that the said Letters Patent should read as corrected below.

Column 2, line 8, after "dipropylene" insert -- glycol --.

Signed and sealed this 5th day of December 1961.

(SEAL)
Attest:

ERNEST W. SWIDER
Attesting Officer

DAVID L. LADD
Commissioner of Patents

USCOMM-DC